United States Patent [19]

Johnson et al.

[11] Patent Number: 4,939,109

[45] Date of Patent: Jul. 3, 1990

[54] PASSIVATION OF METAL CONTAMINATED CRACKING CATALYSTS

[75] Inventors: Marvin M. Johnson, Bartlesville, Okla.; Donald C. Tabler, Fort Collins, Colo.

[73] Assignee: Phillips Petroleum Company, Bartlesville, Okla.

[21] Appl. No.: 907,767

[22] Filed: Sep. 15, 1986

[51] Int. Cl.$^5$ .................. B01J 38/66; B01J 29/38; B01J 21/20; C01G 11/04

[52] U.S. Cl. .................. 520/26; 208/52 C T; 208/113; 208/114; 208/120; 502/29; 502/33; 502/41; 502/521

[58] Field of Search .............. 502/521, 26, 29, 33, 502/41; 208/52 C T

[56] References Cited

U.S. PATENT DOCUMENTS

| | | | |
|---|---|---|---|
| 2,575,258 | 11/1951 | Corneil et al. | 252/417 |
| 2,591,368 | 4/1952 | McCarthy | 260/17 |
| 2,901,419 | 8/1959 | Brill | 208/119 |
| 3,120,484 | 2/1964 | Mills et al. | 208/120 |
| 3,300,423 | 1/1967 | Brown et al. | 260/17 |
| 3,711,422 | 1/1973 | Johnson et al. | 252/414 |
| 3,994,825 | 11/1976 | Crompton et al. | 252/309 |
| 4,031,002 | 6/1977 | McKay | 208/52 C T |
| 4,051,064 | 9/1977 | Crompton et al. | 252/309 |
| 4,141,858 | 2/1979 | McKay | 252/439 |
| 4,207,204 | 6/1980 | McKay et al. | 208/52 C T |
| 4,216,120 | 8/1980 | Nielsen et al. | 252/430 |
| 4,235,704 | 11/1980 | Luckenbach | 208/113 |
| 4,280,898 | 7/1981 | Tatterson et al. | 208/119 |
| 4,289,608 | 9/1981 | McArthur | 502/521 |
| 4,321,129 | 3/1982 | Bertus et al. | 208/120 |
| 4,432,890 | 2/1984 | Beck et al. | 502/62 |
| 4,483,765 | 11/1984 | Payne | 208/120 |
| 4,522,704 | 6/1985 | Bertsch | 208/113 |

OTHER PUBLICATIONS

GAF Product Brochure, "GANTREZ ® AN Copolymer".

GAF Product Brochure, "GANTREZ ® S-95".

The Condensed Chemical Dictionary–Sixth Edition Published by–Reinhold Publ. Corp.,–New York–p. 954–PVM/MA.

*Primary Examiner*—Paul E. Konopka
*Attorney, Agent, or Firm*—Richmond, Phillips, Hitchcock & Umphlett

[57] ABSTRACT

This invention comprises improvements to processes for the catalytic cracking of hydrocarbon feedstocks. One such improvement to catalytic cracking processes provides compositions comprising metals passivating agents having an increased degree of stability. These compositions comprise aqueous suspensions of antimony by vinyl copolymers, aqueous suspensions of antimony oxide by diesters of phosphoric acid, or aqueous suspensions of antimony oxide by cellulose derivatives. Another improvement to catalytic cracking processes provides a process for reducing the viscosity of liquid suspensions of metals passivating agents without substantially reducing the stability of the liquid suspension by the utilization of at least two different particle ranges of metals passivating agents. A further improvement to catalytic cracking processes provides an efficient utilization of metals passivating agents by introducing the selected agent into the catalyst regeneration cycle of a catalytic cracking unit.

17 Claims, 1 Drawing Sheet

PASSIVATION OF METAL CONTAMINATED CRACKING CATALYSTS

The present invention relates to the art of catalytic cracking of hydrocarbons. Particularly, the invention relates to the restoration of cracking catalysts which have contacted a hydrocarbon feedstock. More particularly, the invention relates to the passivation of contaminating metals, deposited onto cracking catalysts which have contacted a hydrocarbon feedstock, through the utilization of passivating agents.

BACKGROUND OF THE INVENTION

Fossil fuels are one of the world's leading sources of energy. However, known oil reserves are finite; therefore, there exists a need to improve the process for converting crude oil into usable petroleum products.

The rising demand for oil and oil products has led to the conversion of higher molecular weight crude oils into these desired products. One method of accomplishing this conversion is by reducing the molecular weight of these heavy crude oils. One principal method utilized in reducing the molecular weight of hydrocarbons is referred to as "catalytic cracking". Generally, with this method, hydrocarbon feedstocks containing higher molecular weight hydrocarbons have their molecular weight reduced (i.e. "cracked") by being contacted under elevated temperatures with a cracking catalyst thereby producing light distillates such as gasoline.

In the catalytic cracking of hydrocarbon feedstocks, particularly heavy feedstocks, metals such as nickel, iron, copper and/or cobalt, present in the feedstocks, become deposited on the cracking catalyst promoting excessive hydrogen and coke formations. Since the production of hydrogen and/or coke generally has an adverse effect on the production of usable products, these are undesirable products of a cracking process. Although the cracking catalyst does undergo a regeneration process, the metal contaminants, which cause the excessive formation of hydrogen and coke, are not removed by a catalyst regeneration operation. Therefore, there exists a need to mitigate the adverse effects of contaminating metals on cracking catalysts.

One method of mitigating a portion of these adverse effects is through a process called metals passivation. As used hereinafter, the term "passivation" is defined as a method for decreasing the detrimental catalytic effects of metal contaminants. In accordance with such a metals passivation process, the terms "metal contaminants and/or contaminating metals" as used herein, refers to metals selected from the group consisting essentially of nickel, iron, copper and cobalt which become deposited on the cracking catalyst during a catalytic cracking process. Therefore, by passivating the contaminating metals on cracking catalysts, the catalysts' life and desired product yields can be prolonged and increased respectively.

It is known that some of the aformentioned metal deposits, which contaminate cracking catalysts, can be passivated by contacting the contaminated catalyst with various metals passivating compounds. One particular type of metals passivating compound is a solid passivating agent suspended in a liquid medium. There are, however, inherent problems associated with such a compound. The first problem concerns the stability of the suspended compound. Specifically, in the past, it was difficult to arrive at a composition which would maintain the solid particles suspended for a long period of time. This low degree of stability causes many problems. For example, one such problem is variations in concentrations of the suspended passivating agent. Thus, it becomes very difficult to determine the amount of passivating agent actually being discharged into the catalytic cracking unit. Moreover, another problem resulting from poor stability is that of creating a requirement to continually agitate the aqueous suspention. However, even when continually agitated, the particles of passivating agent begin to settle the instant that agitation ceases; thus, reverting to the first problem of varying concentrations of passivating agent being suspended in the aqueous solution. Therefore, one object of this invention is to provide novel compositions of suspended passivating agents which have an improved degree of stability.

Another inherent problem associated with conventional aqueous suspensions of metals passivating agents concerns the viscosity of the suspended solution. In the past, it has been difficult to arrive at a composition which is stable and effective and also maintains a low viscosity. In commercial applications a passivating agent suspended in solution which has a high viscosity often causes many problems. These problems arise since an aqueous passivating agent generally must be pumped through various conduits and ultimately dispersed into a catalytic cracking system at a relatively high velocity. When the aqueous passivating agent is viscous, commercial applications becomes often very difficult and sometimes even impossible. Moreover, the need for a low viscosity aqueous suspension becomes greater as the geographical ambient temperature decreases. For example, in refineries where the ambient temperature nears 0° C., a solution having a low viscosity is desired. Therefore, another object of this invention is to provide a novel process for making novel compositions of suspended passivating agents which are stable and have a low viscosity.

A conventional method of carrying out the metals passivation Process is by dispersing the selected metals passivating agent either directly into the hydrocarbon cracking reactor or into the hydrocarbon feedstream. While these methods have been successful, there is always a need for new and improved metals passivation processes. Therefore, another object of this invention is to provide an improved metals passivation process resulting in a more efficient method of introducing any suitable passivating agent into or onto a contaminated catalyst so as to improve the degree of metals passivation.

SUMMARY OF THE INVENTION

In one aspect, this invention provides, among other things, an improved catalytic cracking process wherein at least one adverse affect of metal contaminants, such as nickel, iron, copper and/or cobalt in or on a hydrocarbon cracking catalyst, is precluded or mitigated by contacting the contaminated cracking catalyst during the catalytic cracking process, or by modifying the cracking catalyst prior to the catalytic cracking process, with improved stable aqueous suspensions of passivating agents comprising antimony. The novel compositions of suspended passivating agents, provided by the present invention, may be described as follows:

1. compositions comprising an aqueous suspension of antimony by vinyl copolymers;

2. compositions comprising an aqueous suspension of antimony oxide by diesters of phosphoric acid; or 3. compositions comprising an aqueous suspension of antimony oxide by cellulose derivatives.

In another aspect, this invention provides a novel process for reducing the overall viscosity of a liquid suspension of a metals passivation agent by utilizing at least two different particle ranges of a metals passivation agent.

In yet another aspect, this invention provides a more efficient utilization of a metals passivation agent by introducing the selected metals passivation agent into the catalyst regeneration cycle.

Further objects, embodiments, advantages, features and details of this invention will become apparent to those skilled in the art from the following detailed description of the invention and the appended claims, as well as a description of the drawing which is briefly described as follows.

DETAILED DESCRIPTION OF THE INVENTION

Figure 1:
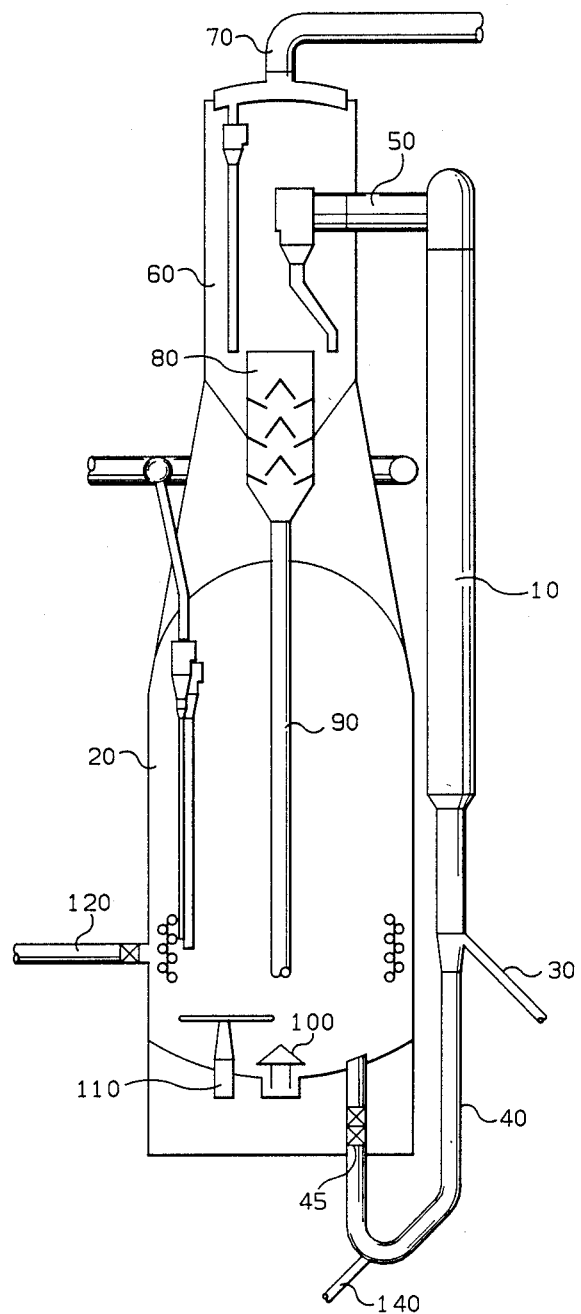
FIG. 1 is a diagramatic illustration of a hydrocarbon catalytic cracking unit.

In accordance with this disclosure, the term "cracking catalyst" refers to any catalytic cracking material which may be suitable for cracking hydrocarbons. In practicing the embodiments of this invention, any suitable cracking catalyst may be utilized. If desired, the cracking catalyst can contain a combustion promoter such as platinum or chromium. A "conventional cracking catalyst" as disclosed herein can be any of those cracking catalysts commonly employed in the catalytic cracking of hydrocarbons. Such conventional cracking catalysts generally contain silica or silica-alumina. Furthermore, such conventional cracking catalysts are frequently associated with zeolitic materials. Zeolite-modified, silica-alumina catalysts are particularly applicable in this invention.

The term "modified cracking catalyst" as used herein refers to any cracking catalyst which has been modified by being contacted, either prior to or during the catalytic cracking process, by any metals passivating agent.

As used herein, a "used cracking catalyst" and/or a "contaminated (cracking) catalyst" refers to any cracking catalyst which has contacted a hydrocarbon feedstock containing contaminating metals selected from the group consisting essentially of nickel, iron copper and cobalt; thus, contains such contaminating metals therein or thereon. Conversely, an "unused cracking catalyst" as employed in the present invention, refers to any cracking catalyst which has not yet contacted the hydrocarbon feed and thus contains essentially no contaminating metals therein or theron. Particularly the nickel, iron, copper and cobalt metals content of the unused cracking catalyst can generally be defined by the following limits:

| Metal | Metal Content of Unused Catalyst in Weight Percent |
|---|---|
| Nickel | 0 to 0.02 |
| Iron | 0 to 0.80 |
| Copper | 0 to 0.02 |
| Cobalt | 0 to 0.02 |

The weight percentage limits of the above table relate to the total weight of an unused cracking catalyst including the metals nickel, iron, copper and/or cobalt, but excluding the added passivating agent which would modify the cracking catalyst.

A "metals passivation process" as used herein refers to a procedure conducted in a catalytic cracking unit wherein adverse effects, caused by contaminating metal deposits from the feedstock, are precluded or mitigated by the utilization of a particular metals passivating agent. Conventional methods of metals passivation have been either dispersing a passivating agent into the hydrocarbon cracking reactor or the hydrocarbon feedstream.

Accordingly, the term "metals passivating agent" as used herein refers to any suitable metal composition which has the ability to passivate contaminating metals in or on cracking catalysts without substantially hindering the cracking activity of the catalyst. Since one of the main purposes of a metals passivating agent is to prevent or mitigate the otherwise occurring undesirable affects of contaminating metals, the components of the metals passivating agents incorporated into or onto the conventional cracking catalyst should be essentially free of any such contaminating metals. Examples of suitable metal compositions, applicable as metals passivating agents, include but are not limited to, antimony, tin and lithium. Preferably the metals passivating agent comprises antimony. The term "antimony", as used in this disclosure, refers to any suitable antimony source which is either itself an oxide or is convertible to an oxide. Examples of suitable antimony sources include, but are not limited to, antimony trioxide, antimony tetroxide, antimony pentoxide and the like. Mixtures of any two or more suitable antimony sources can be employed.

In accordance with one such aspect of this invention, the stability of aqueous suspensions of passivating agents is improved by providing novel compositions of suspended passivating agents. One of these novel compositions providing a stable aqueous suspension, comprises antimony as the passivating agent, and a vinyl copolymer as the suspending agent. The form in which the antimony is present in this novel passivating agent is not critical. Any suitable form of antimony, which provides at least some degree of passivation of contaminating metals, can be utilized. Thus, elemental antimony, inorganic antimony compounds and organic antimony compounds, as well as mixtures of any two or more of the above, can be suitable sources of antimony. Preferably, the antimony used in this novel passivating agent comprises at least one of the following: antimony trioxide, antimony tetroxide and antimony pentoxide. More preferably, the antimony comprises antimony trioxide, due in part to its stability at elevated temperatures, its melting point and its commercial availability and cost.

The form in which the vinyl copolymer is present in this novel passivating agent is also not critical. Any suitable vinyl copolymer, which has the ability to maintain the selected antimony suspended in an aqueous solution may be utilized. An example of a suitable vinyl copolymer includes, but is not limited to, a hydrolyzed copolymer of methylvinyl ether and maleic anhydride. Preferably, the vinyl copolymer suspending agent comprises the ammonium salt of a hydrolyzed copolymer of methylvinyl ether and maleic anhydride.

Any suitable weight percentage ranges of water, antimony and vinyl copolymeric suspending agent may be used. Preferably, the amount of water ranges from about 10 to about 97 weight percent; the amount of antimony ranges from about 1 to about 50 weight percent; and the amount of the vinyl copolymer ranges from about 0.2 to about 3 weight percent, these weight percentages being based on the total weight of the novel composition.

This novel composition can be prepared by any suitable process which results in a stable aqueous suspension of the selected passivating agent. Preferably, this novel composition can be prepared by first dissolving the suspending agent in water. Then, the selected passivating agent is added to the aqueous solution and stirred for a suitable period of time. Preferably, the suspension is maintained at a pH range between about 8 to about 12.

A second of these novel compositions, providing stable aqueous suspensions of passivating agents, comprises at least one antimony oxide as the passivating agent, wherein the selected antimony oxide is held suspended in solution by either diesters of phosphoric acid, cellulose derivatives or the ammonium salt of cellulose derivatives.

When practicing this aspect of the invention, any suitable antimony oxide, providing at least some passivation of contaminating metals, can be utilized. Examples of some suitable antimony oxides include, but are not limited to, at least one of the following: antimony trioxide, antimony tetroxide, antimony pentoxide and/or compounds thereof. Preferably, the antimony oxide comprises antimony trioxide or antimony pentoxide. More preferably, the antimony oxide comprises antimony trioxide.

In the embodiment of the invention which provides for the selected antimony oxide to be suspended by a diester of phosphoric acid, any such suspending agent can be used which has the ability of maintaining the antimony oxide in a stable aqueous suspension, but does not substantially hinder the metal passivating ability of the antimony oxide. Preferably, the diester of phosphoric acid suspending agent comprises a dialkyl ester.

Any suitable weight percentage ranges of water, antimony and the dialkyl ester may be used. Preferably, the amount of water ranges from about 10 to about 97 weight percent; the amount of antimony ranges from about 1 to about 30 weight percent; and the amount of the dialkyl ester ranges from about 0.2 to about 5 weight percent, these weight percentages being based on the total weight of the novel composition.

This novel composition can be prepared by any suitable process which results in a stable aqueous suspension of the selected antimony. Preferably, the metals passivating agent can be prepared by first dissolving the suspending agent in water. This solution is then mixed for an appropriate period. The selected passivating agent is then added. This mixture is stirred; thus forming a stable aqueous suspension.

In the embodiment of the invention which provides for the antimony oxide to be suspended by a cellulose derivative, any such suspending agent can be used, which has the ability of maintaining the selected antimony oxide in a stable aqueous suspension, but does not substantially hinder the metal passivating ability of the antimony oxide. Preferably, the cellulose derivative suspending agent comprises the ammonium salt of carboxymethyl cellulose.

Any suitable weight percentage ranges of water, antimony and the cellulose derivative suspending agent may be used. Preferably, the amount of water ranges from about 10 to about 97 weight percent; the amount of antimony oxide ranges from about 1 to about 30 weight percent; and the amount of the cellulose derivative ranges from about 0.2 to about 5 weight percent, these weight percentages being based on the total weight of the novel composition.

This novel composition can be prepared by any suitable process which results in a stable aqueous suspension of the selected antimony. Preferably, the metals passivating agent can be prepared by first dissolving the suspending agent in water. This solution is then mixed for an appropriate period. The selected passivating agent is then added. This mixture is stirred; thus forming a stable aqueous suspension.

When used in commercial applications, the novel compositions of suspended passivating agents are added to the catalytic cracking unit at such a rate as to maintain the concentration of the antimony passivating agent in or on the cracking catalyst within a suitable range which would result in the enhanced passivation of contaminating metals.

Any suitable concentration of a novel passivating agent in or on the cracking catalyst may be used. The amount of antimony which is most desirable in or on the cracking catalyst will vary according to the type of contaminating metals on the catalyst, their effective concentration level thereon and the operating conditions and efficiency of the particular catalytic cracking unit being used, with higher values of antimony being desired for higher effective concentration levels of contaminating metals.

Often, commercial applications of passivating agents are required in geographical areas wherein the ambient temperature drops below 0° C. Under these conditions, if appropriate steps are not taken, the aqueous suspension of a passivating agent may freeze; thus rendering the agent unusable. Therefore, to alleviate such a potential problem, an antifreeze agent can optionally be used as a substitute for any portion of the water in the novel aqueous suspensions of this invention. Any suitable antifreeze agent which does not substantially hinder the passivating ability and/or the overall stability of the aqueous suspension may be utilized. Examples of some antifreeze agents which can be used include, methanol, ethanol, isopropanol, acetone, ethylene glycol and/or any other suitable polar organic compounds which are miscible in water. Preferably, the antifreeze agent comprises ethylene glycol. In the instance where a antifreeze agent is desired as a partial substitute for the water component, the amount of antifreeze used is substantially equal to the amount of water which it replaces.

The catalytic cracking system, in which at least one of the aforementioned novel passivating agents is employed, is a substantial improvement over a conventional cracking process employing a less stable suspension of a passivating agent. When incorporated into a catalytic cracking system, the novel compositions of suspended passivating agents of this invention provide improvements which include, but are not limited to, a greater control of passivating agent concentrations dispersed into the catalytic cracking system and/or a substantial decrease in the amount of agitation required to maintain the passivating agent suspended in the aqueous solution.

The novel compositions provided by this invention are applicable to any suitable hydrocarbon cracking unit using cracking catalysts. Examples of such suitable conventional hydrocarbon cracking units include, but are not limited to a Thermofor Catalytic Cracking Unit (TCCU), a Fluid Catalytic Cracking Unit (FCCU) and a Heavy Oil Cracking unit (HOC), the latter of which is illustrated in FIG. 1. Broadly, all of the above cracking units comprise a hydrocarbon cracking reaction zone and a cracking catalyst regeneration zone.

As used herein, the phrase, "hydrocarbon cracking zone (cycle)", refers to that portion of a hydrocarbon cracking unit pertaining to the catalytic cracking of high molecular weight feedstocks. Generally, the hydrocarbon cracking zone includes all points between that at which the feedstock enters the catalytic cracking unit and that at which the cracked products and used cracking catalyst exit the hydrocarbon cracking reactor.

Conversely, the phrase, "catalyst regeneration zone (cycle)", as used herein refers to that portion of a hydrocarbon cracking unit pertaining to the regeneration of cracking catalysts. Generally, the catalyst regeneration zone includes all points between that at which the cracked products and used cracking catalyst exit the hydrocarbon cracking reactor and that at which the feedstock enters the catalytic cracking unit.

A further embodiment of this invention provides a novel method for decreasing the overall viscosity of a passivating agent while the particular passivating agent is suspended in a liquid medium. For, as stated earlier, in commercial applications, it becomes very difficult, and sometimes even impossible to pump a viscous passivating agent through the various conduits of a catalytic cracking system and inject the same onto the cracking catalyst with the needed velocity.

Any suitable passivating agent may be employed. Preferably, the passivating agent comprises antimony. More preferably, the antimony comprises at least one of the antimony oxides. Even more preferably, the antimony comprises antimony trioxide.

This aspect of the invention is accomplished by utilizing at least two different particle ranges of the passivating agent to be suspended in the liquid medium. Although it is understood that a compound which is in the form of solid particles will inherently have varying particle sizes, nevertheless, some solid passivating agents are obtainable in such forms wherein the diameter of at least 60 percent of their particles fall within a given range.

The liquid medium in which the solid passivating agent is suspended is not critical. Any suitable liquid medium may be used. Examples of a suitable liquid medium include, but are not limited to, water and oil. Preferably the liquid medium is water.

The multiple ranges of the selected passivating agent particle sizes may be suspended by any suitable suspending agent. Examples of suitable suspending agents include, but are not limited to, the vinyl copolymers, diesters of phosphoric acid and cellulose derivatives described previously.

Generally, this embodiment of the invention provides that, by combining larger diameter antimony particles with smaller diameter antimony particles, the overall viscosity of the suspended solution will decrease without substantially decreasing the overall stability or passivating effectiveness of the solution. To effectively practice this embodiment, the larger diameter antimony particles should be such that at least 60 percent of their diameters fall within the range from about 1 micron to about 6 microns. Moreover, the smaller diameter antimony particles should be such that at least 60 percent of their diameters fall within the range from about 0.01 microns to about 0.99 microns.

These novel metals passivating agents, having a low viscosity, can be prepared by any suitable process which results in a stable aqueous suspension of the selected antimony. Preferably, the metals passivating agent can be prepared by first dissolving the suspending agent in the liquid medium. The various grades of the passivating agent are then added to the aqueous solution while stirring. Preferably, the pH of the solution should be maintained within the range from about 8 to about 12. The solution is then stirred until a stable aqueous suspension is formed. Generally, the stirring will not exceed one hour.

The usefulness of this aspect of the invention increases substantially when combined with any of the novel compositions disclosed earlier. For, when combined, the net result will be a stable aqueous suspension of an effective metals passivating agent which has a low viscosity.

In accordance with yet a further embodiment of this invention, the novel compositions of low viscosity and/or stable aqueous suspensions of metals passivating agents, as well as any other suitable metals passivating agent, is more efficiently introduced onto a metal contaminated cracking catalyst. Specifically, this embodiment provides that by introducing the selected metals passivating agents into the catalyst regeneration cycle of a catalytic cracking process, the fraction of passivating agent adhering to the contaminated catalyst will increase. This increased degree of adhesion (i.e. increased "lay-down efficiency") of passivating agent onto cracking catalyst can, for a given amount of passivating agent, increase the degree of passivation and/or improve product yields; or, for a desired degree of passivation, decrease the amount of passivating agent required.

The preferred point of the catalyst regeneration cycle for injecting a passivating agent may differ depending on the particular passivating agent selected. Generally, a preferred point of injection is that where the temperature range, in that portion of the catalyst regeneration cycle, exceeds the selected passivating agent's melting point.

To illustrate the operability of this invention, it is described in terms of a conventional Heavy Oil Cracking Unit (HOC) as shown in FIG. 1. Referring specifically to FIG. 1, hydrocarbon feedstock enters the cracking reactor 10 through conduit 30. In this particular illustration, hydrotreated residual oil is utilized as the hydrocarbon feedstock and the primary objective of the particular cracking unit is to produce gasoline. However, other hydrocarbon feedstocks may be utilized and the most desired product may be something other than gasoline.

The hydrocarbon cracking catalyst is metered into the catalyst standpipe 40 through slide valve 45. The cracking catalyst contacts the hydrocarbon feedstream and both enter the cracking reactor 10.

The specific conditions in the hydrocarbon cracking zone are not critical and depend upon several parameters such as the feedstock used, the catalyst used and the results desired. Most commonly, however, the cracking conditions are within the following ranges:

| Hydrocarbon Cracking Zone | |
| --- | --- |
| Temperature: | 800°–1200° F., (427°–649° C.). |
| Time: | 1–40 seconds. |
| Pressure: | Atmospheric – 30 psig. |
| Catalyst to oil ratio: | 3:1–30:1 by weight. |

The cracked feedstock and used catalyst flows via conduit 50 into disengager 60, which separates the components from one another. The cracked oil exits the disengager 60 through conduit 70, while the used catalyst flows via gravity into catalyst stripper 80, which further removes essentially all entrained liquids or gaseous hydrocarbons from the catalyst. The stripping process may be accomplished by any suitable means. Generally, the stripping is done with steam.

The used, stripped catalyst then flows by way of seal leg 90 into the regenerator 20. At the lower end portion of seal leg 90, the used catalyst plug valve 100 meters the flow of catalyst into the regenerator 20. In regenerator 20, air, which supplies the oxygen required to burn off carbon (i.e., coke) from the used catalyst, is blown through air distributor 110.

The specific conditions in the catalyst regeneration zone are not critical and depend upon several parameters such as the feedstock used, the catalyst used and the results desired. Most commonly, however, the regeneration conditions are within the following ranges:

| Catalyst Regeneration Zone | |
| --- | --- |
| Temperature: | 1000°–1500° F., (538°–816° C.). |
| Time: | 2–40 minutes. |
| Pressure: | Atmospheric – 30 psig. |
| Air at 60° F. (16° C.) and at 1 atmosphere: | 100–250 ft$^3$/lb. coke, (6.2–15.6 m$^3$/kg coke). |

When carrying out a conventional cracking process, it is common to replace a fraction of the total cracking catalyst with fresh unused cracking catalysts either continuously or intermittently. The actual quantity of fresh unused catalyst added depends in part upon the nature of the feedstock used and the efficiency of the cracking unit.

The make-up quantity of fresh unused cracking catalyst can be added at any suitable location in the cracking process. Generally, the make-up catalyst is introduced into the catalyst regenerator as illustrated in FIG. 1 by conduit 120.

The regenerated catalyst exits regenerator 20 through slide valve 45 which meters the catalyst into catalyst standpipe 40. This completes the flow of catalyst.

As stated earlier, in accordance with an embodiment of this invention, the metals passivating agent is added in the catalyst regeneration cycle. Referring again to FIG. 1, and assuming that the catalyst is flowing in a counter-clockwise direction, the catalyst regeneration cycle of that cracking unit includes any point between that at which conduit 50 extends from cracking reactor 10 and that at which conduit 30 is ported into cracking reactor 10. Specifically, discharging a metals passivating agent into the catalyst regeneration cycle includes, but is not limited to, discharging the agent into any one or more of the following areas: disengager 60, catalyst stripper 80, seal leg 90, regenerator 20 and/or catalyst standpipe 40. In FIG. 1, the passivating agent is introduced into the catalyst standpipe 40 through conduit 140. Preferably, the metals passivating agent is introduced into that area of the catalyst regeneration zone which has the highest temperature ranges and/or the highest catalyst concentrations. Specifically, this would include introducing the passivating agent at any point between that at which used catalyst enters the catalyst regenerator and that at which regenerated catalyst contacts the hydrocarbon feedstream.

When the metals passivating agent is introduced into the catalyst regeneration cycle, clear and definite advantages will be observed in comparison to conventional methods of introducing passivating agents. These advantages may include, but are not limited to, at least one of the following: a decreased production of hydrogen, a decreased production of coke, a decrease in the amount of passivating used for a given degree of passivation, an increased conversion of hydrocarbon feedstock, an increased production of gasoline, an increase in catalyst activity and/or an increase in the degree of passivation for a given amount of passivating agent.

As stated earlier, the feedstocks employed in the catalytic cracking process of this invention contain contaminating metals. The feedstocks include, but are not limited to, those which are conventionally utilized in catalytic cracking processes to produce gasoline and light distillate fractions from heavier hydrocarbon feedstocks. The feedstocks generally have an initial boiling point above about 400° F. (204° C.) and include, but are not limited to, fluids such as gas oils, fuel oils, cycle oils, slurry oils, topped crudes, shale oils, oils from tar sands, oils from coal, mixtures of two or more of these, and the like. The term "topped crudes" as used herein refers to those oils which are obtained as the bottoms of a crude oil fractionator. If desired, all or a portion of the feedstock can constitute an oil from which a portion of the metal content previously has been removed. Typically, the feedstock used in the process of this invention will contain at least one contaminating metal within the range shown in the following table:

| Metal | Metal Content of Feedstocks, ppm[1] |
| --- | --- |
| Nickel | 0.02 to 100 |
| Iron | 0.02 to 500 |
| Total metals[2] | 0.20 to 500 |

[1] The ppm metal content refers to the parts per million by weight of contaminating metal(s) in relation to the feedstock as used.
[2] "Total metals" in this table and elsewhere refers to the sum of the contaminating metals in the feedstock that are effective in reducing the activity of the cracking catalyst; the total metals content can be determined in accordance with methods well known in the art, e.g., by atomic absorption spectroscopy.

An important aspect of this invention resides in providing an improved heavy oil cracking process. In conventional heavy oil cracking processes wherein no passivating agent is used, it is possible to crack heavy oils having a metal content up to about 80 ppm of total metals. Economically, marginal results are obtained with oils having 40 to about 80 ppm of total matals. However, in accordance with this invention, heavy oils with a total metals content of about 40 to about 100 ppm and even those of about 100 to about 500 ppm of total metals can be cracked in the absence of added hydrogen, by utilizing the modified cracking catalyst defined above, to yield gasoline and other fuels and fuel blending components. Thus, known heavy oils with total metal of about 80 to about 500 ppm that heretofore could not be directly used for fuel production and, in particular, for gasoline or higher boiling hydrocarbon fuels production in accordance with this invention, can be cracked to yield gasoline and other higher-boiling hydrocarbon fuels including, but not limited to, kerosene, diesel fuel and burning oils.

As stated earlier, the passivating agents which can be employed in the novel process of introducing the agent into the catalyst regeneration cycle may be any suitable passivating agent which has the ability to passivate contaminating metals without substantially hindering the cracking activity o the catalyst. In addition to all of the novel compositions of low viscosity and/or stable aqueous suspensions of passivating agents provided by this invention, other examples of suitable passivating agents include, but are not limited to, elemental antimony, inorganic antimony, and organic antimony compounds. Preferably, suitable passivating agents include, but are not limited to, antimony trioxide, antimony trioxide sprayed with light cycle oil, aqueous suspensions of antimony trioxide by a vinyl copolymer, antimony mercaptides and aqueous suspensions of antimony pentoxide. The amount of the selected passivating agent, discharged into or onto the cracking catalyst will depend upon various factors such as the efficiency of the catalytic cracking process, the extent of metal contamination of the catalyst and/or the quantity of metal contaminants in the feedstock.

The following examples illustrate embodiments for carrying out the aspects of this invention. However, these examples are not to be construed as limiting the invention to the specifics involved therein.

EXAMPLE I

This example illustrates the composition and process of preparing a novel composition of a stable suspension of a metals passivating agent comprising antimony trioxide as the passivating agent and the ammonium salt of hydrolyzed copolymer of methylvinyl ether and maleic anhydride as the suspending agent having the following composition:

TABLE I

| Ingredients | Weight in Grams | Percent by Weight |
|---|---|---|
| Water | 30.0 | 59.29 |
| Ammonium salt of hydrolyzed copolymer of methylvinyl ether and maleic anhydride[1] | 0.6 | 1.19 |
| Antimony trioxide | 20.0 | 39.52 |

[1]The hydrolyzed copolymer of methylvinyl ether and maleic anhydride used in the above composition was commercially available GANTREZ S-95, produced by GAF Corporation.

This novel composition was prepared by first dissolving the suspending agent in water. Then, the antimony trioxide is added to the aqueous solution and stirred for approximately one hour. The aqueous solution was maintained at a pH range between 10 and 11. The novel aqueous suspension described in Table I held the antimony suspended in solution for approximately eight weeks. In conventional aqueous suspensions, the particulate passivating agent begins to settle after approximately 5 minutes. Thus, when compared to conventional aqueous suspensions, the passivating agent described in this example is more suitable for use in commercial applications.

As stated earlier, under certain environmental conditions, it is sometimes desirable to add an antifreeze agent to passivating agents. An example of a metal passivating agent utilizing an antifreeze agent was prepared having the following composition:

TABLE II

| Ingredients | Weight in Grams | Percent by Weight |
|---|---|---|
| Ethylene glycol | 12.0 | 23.72 |
| Water | 18.0 | 35.57 |
| Hydrolyzed copolymer of methylvinyl ether and maleic anhydride[1] | 0.6 | 1.19 |
| Antimony trioxide | 20.0 | 39.52 |

[1]See footnote 1 of Table 1.

While the novel composition described in Table II effectively decreased the composition's freezing point, the addition of ethylene glycol did not decrease the stability of the aqueous solution.

EXAMPLE II

This example illustrates the composition and process of preparing a novel composition of a stable suspension of a metals passivating agent comprising antimony trioxide as the passivating agent and the dialkyl ester of phosphoric acid as the suspending agent having the following composition:

TABLE III

| Ingredients | Weight in Grams | Percent by Weight |
|---|---|---|
| Water | 200.0 | 93.90 |
| Dialkyl ester of phosphoric acid[1] | 3.0 | 1.41 |
| Antimony trioxide | 10.0 | 4.69 |

[1]The dialkyl ester used in the above composition was commercially available MONAFAX 831, produced by Mona Industries.

The novel composition described in Table III was prepared by first dissolving the dialkyl ester in water. This solution was then poured into a blender. The antimony trioxide was then added to the blender. After blending the solution for approximately 30 seconds, a stable suspension was formed. Forty days, after this novel aqueous suspension was initially blended, an insignificant amount of particle settling was observed. In conventional aqueous suspensions, the particulate passivating agent begins to settle after approximately 5 minutes. Thus, when compared to conventional aqueous suspensions, the passivating agent described in this example is more suitable for use in commercial applications.

EXAMPLE III

This example illustrates the composition and process of preparing a novel composition of a stable suspension of a metals passivating agent comprising antimony trioxide as the passivating agent and the ammonium salt of carboxymethyl cellulose as the suspending agent having the following composition:

TABLE IV

| Ingredients | Weight in Grams | Percent by Weight |
|---|---|---|
| Water | 200.0 | 92.88 |
| Ammonium salt of carboxymethyl cellulose[1] | 0.3 | 0.12 |
| Antimony trioxide | 15.1 | 7.00 |

[1]The carboxymethyl cellulose used in the above composition was commercially available CMC, provided by Hercules Corporation.

The novel composition described in Table IV was prepared by a process similar to that described in Example I.

The novel aqueous suspension described in Table IV held the selected antimony oxide suspended in solution for over one month. In conventional aqueous suspensions, the particulate passivating agent begins to settle after approximately 5 minutes. Thus, when compared to conventional aqueous suspensions, the passivating agent described in this example is more suitable for use in commercial applications.

EXAMPLE IV

This example illustrates the composition and process for reducing the viscosity of a metals passivating agent suspended in an aqueous solution by using, as the passivating agent, two different grades of antimony trioxide wherein one grade is finer than the other. The finer grade of antimony trioxide used in this example is commercially available under the trade name of Ultrafine II, as supplied by Laurel Industries. Approximately 90 percent of these finer diameter antimony particles have a diameter of less than one micron. The larger grade of antimony trioxide used in this example is commercially available under the trade name of Grade KR, as supplied by Amspec Chemical Corporation. These larger diameter particles have a diameter wherein at least 70 percent are within the range from about 1 microns to about 5 microns.

The suspending agent used in this example is a hydrolyzed copolymer of methylvinyl ether and maleic anhydride which is commercially available as Gantrez S-95.

The metals passivating agent of this example had the following composition:

TABLE V

| Ingredients | Weight in Grams | Percent by Weight |
|---|---|---|
| Water | 96.0 | 47.9 |
| Ethylene glycol | 64.0 | 31.9 |
| Gantrez S-95 | 0.6 | 0.3 |
| Ultrafine II($Sb_2O_3$) | 20.0 | 10.0 |
| Grade KR($Sb_2O_3$) | 20.0 | 10.0 |

The novel composition described in Table V was prepared by first mixing the water with the ethylene glycol. Then, the suspending agent, Gantrez S-95, was dissolved in the aqueous solution. Both grades of the antimony trioxide were then added to the aqueous solution while stirring with a propellor-type stirrer at moderate speed. The pH of the solution was maintained at approximately 10, by adding approximately 1 ml of concentrated ammonium hydroxide solution. After stirring the solution for approximately one hour, a stable aqueous suspension was formed.

Table VI illustrates the decrease in viscosity when a multi-ranged particulate passivating agent is used. Specifically, in Table VI, Agent A is the novel composition described in Table V, and Agent B is a passivating agent similar to that described in Table V, except that all the antimony used is Ultrafine II antimony trioxide.

The results in Table VI were determined by a Fann Viscometer (FI spring). The observed data is as follows:

TABLE VI

| Constant Conditions | | Shear Stress | | Viscosity | |
|---|---|---|---|---|---|
| rpm | Shear Rate | Agent A | Agent B | Agent A | Agent B |
| 3 | 5 | 58.73 | 99.58 | 1150.0 | 1950.0 |
| 6 | 10 | 86.82 | 109.08 | 850.0 | 1075.0 |
| 100 | 170 | 150.65 | 219.59 | 88.5 | 129.0 |
| 200 | 340 | 211.93 | 265.55 | 41.5 | 78.0 |
| 300 | 511 | 265.55 | 326.83 | 52.0 | 64.0 |
| 600 | 1021 | 383.01 | 413.35 | 37.5 | 40.5 |

TABLE VI-continued

[1]Shear Stress is in dynes/$cm^2$.
[2]Shear Rate is in 1/second.
[3]Viscosity is in centipoise.

As seen in Table VI, the aqueous suspension made by only using the finer grade antimony trioxide (i.e. Agent B) has greater viscosity and shear strength co-efficients when compared to the multi-ranged particulate passivating agent (i.e. Agent A). Furthermore, it should be noted the viscosity of an aqueous solution, wherein only the heavier grade antimony particles were suspended, was not recordable since the heavier grade particles would not remain suspended once stirring ceased. Thus, when only the heavier grade particles were used, the solution had a very low stability (i.e. the heavier grade particles would not remain suspended in an aqueous solution).

Therefore, Table VI clearly illustrates that the multi-ranged particulate passivating agent effectively reduces shear stress and viscosity characteristics; thus making the multi-ranged particulate passivating agent adaptable to commercial applications.

EXAMPLE V

This example will illustrate the effectiveness of introducing a metal passivating agent into the regeneration cycle of a cracking catalyst over that of injecting the same passivating agent into the hydrocarbon feedstream or the hydrocarbon cracking reactor. These comparative tests were conducted on a laboratory bench scale version of an FCCU.

The procedure used to introduce the passivating agents of this example was based upon continuously cycling the catalyst in the bench unit. Specifically, in this example, the catalyst was subjected to 125 cycles, one cycle being 1 complete hydrocarbon cracking step and 1 complete catalyst regeneration step. After each 25th cycle, the cracked products were collected in a gas trap at ice temperature and then sent to an analyzer. At the end of the 125th cycle, a final collection of cracked products was performed and the surface area and metals content of the catalyst was determined. Gas and liquid products were analyzed by a chromatograph. The quantity of gasoline, light cycle oil and heavy cycle oil was determined by simulated distillation using a Hewlett-Packard 5880 Gas Chromatograph System. The coke quantity was determined by weighing the reactor plus catalyst before and after regeneration.

In illustrating the advantages of discharging a passivating agent into the catalyst regeneration cycle, three different passivating agents were used. These passivating agents were as follows: an aqueous suspension of antimony pentoxide, commercially available as NALCO 5000; an aqueous suspension of antimony trioxide, as disclosed in Table I of this invention; and solid antimony trioxide.

The results observed in the bench unit are summarized in Table VII. To eliminate random experimental effects and increase precision of the results in Table VII, data was collected over a range of cycles and the results were curve-fit. The results recorded in Table VII are taken at the point where the 125th cycle intersects the respective curves.

tion cycle of a catalytic cracking unit, a significantly greater amount of the passivating agent is deposited

TABLE VII

| Yields (Wt. %) | Aqueous Antimony Pentoxide | | Net Change (Wt. %) | Aqueous Antimony Trioxide | | Net Change (Wt. %) | Solid Antimony Trioxide[5] | | Net Change (Wt. %) | Blank Run[2] |
|---|---|---|---|---|---|---|---|---|---|---|
| | Feed | Regenerator | | Feed | Regenerator[1] | | Feed | Regenerator | | |
| Conversion | 74.28 | 73.54 | <1.0>[6] | 72.76 | 73.40 | 0.9 | 74 | 74 | 0 | 73.7 |
| Hydrogen | 245 | 255 | 4.1 | 212 | 213 | 0.5 | 224 | 200 | <10> | 263 |
| Coke | 15.47 | 13.90 | <10.1> | 14.81 | 13.15 | <11.2> | 16 | 15 | <6> | 16.5 |
| Gasoline | 46.09 | 47.39 | 2.8 | 46.01 | 48.55 | 5.5 | 42 | 45 | 7 | 44.8 |
| Light Cycle Oil | 17.19 | 17.57 | 2.2 | 17.52 | 17.50 | <0.1> | 17 | 18 | 6 | 16.8 |
| Heavy Cycle Oil | 8.55 | 8.89 | 4.0 | 9.72 | 9.09 | <6.5> | 10 | 9 | <10> | 9.5 |
| C$_4$'s etc. | 12.70 | 12.26 | <3.5> | 11.93 | 11.71 | <1.8> | 12 | 13 | 8 | 12.4 |
| Lay-down Eff.[3] | 9.75 | 21.50 | 123.7 | 34.25 | 20.50[4] | <40.1> | 14.5 | 17.5 | 20.7 | — |

[1]Yields may not be indicative of those to be expected under commercial conditions.
[2]Standard run without any form of passivation.
[3]Percentage of injected antimony which was deposited on catalyst. Total antimony injected over each catalyst was that amount which would result in an antimony concentration of 4000 parts per million (ppm) if a 100 percent lay-down efficiency and no catalyst losses or withdrawals.
[4]This result not believed to be correct due to procedural limitations.
[5]The solid antimony trioxide injected in the feed is powder antimony trioxide and that injected in the regenerator is antimony trioxide sprayed with light cycle oil.
[6]The brackets < > around a number denoted a percentage decrease.

The results from Table VII illustrate the effectiveness of injecting a passivating agent into the regeneration cycle of a catalytic cracking system. It should be noted, however, that due to inherent limitations of the bench unit, the only point at which the passivating agent may be injected into the catalyst regeneration cycle is the simulated catalyst regenerator. Furthermore, although clearly illustrating the utility of this invention, it is believed that the results observed in Table VII, when injecting any of the passivating agents into the catalyst regeneration cycle of the bench unit are not as favorable as would be observed if under actual commercial conditions. This latter statement is supported by the following example.

EXAMPLE VI

This example will illustrate the advantage of injecting a passivating agent into the catalyst regeneration cycle over that of injecting a passivating agent into the hydrocarbon feedstock under actual commercial conditions. The results in this example were observed at Phillips Petroleum Company's Sweeny, Tex. refinery. The catalytic cracking unit at the Sweeny refinery is similar to that illustrated in FIG. 1 of this application. As shown in FIG. 1, the point at which the passivating agent is injected is in the catalyst standpipe 40, between the catalyst regenerator 20 and the cracking reactor 10.

In this example, antimony tris(hydroxyethyl mercaptide), commercially available as Phil-Ad CA 3000, was injected into the hydrocarbon feedstream of the catalytic cracking unit. The average lay-down efficiency of antimony onto the catalyst, calculated over a two month period, was approximately 43 percent.

The aqueous antimony trioxide solution of Example I was then injected into the catalyst standpipe 40. The approximate lay-down efficiency of this latter passivating agent when injected into the catalyst standpipe was approximately 61 percent. Although the passivating agent which was injected into the catalyst standpipe differed from that which was injected into the hydrocarbon feedstream, nevertheless, it is believed that the increased lay-down efficiency was attributable to the point at which the agent was injected.

When comparing the above results, a 42 percent increase in the passivating agent's lay-down efficiency is observed when the metals passivating agent is discharged into the catalyst regeneration cycle of the catalytic cracking unit. In other words, when the metals passivating agent is injected into the catalyst regeneration cycle of a catalytic cracking unit, a significantly greater amount of the passivating agent is deposited onto the contaminated catalyst. Conversely, a lesser amount of the passivating agent is lost to the slurry oil. The net result of this increased lay-down efficiency may be a greater degree of passivation, a lesser amount of passivation agent needed and an overall reduction in the production costs per barrel of oil discharged into a catalytic cracking unit.

Therefore, from the results of this example, it is clear that there exists a definite advantage when injecting a passivating agent into the catalyst regeneration cycle of a catalytic cracking unit. Furthermore, when comparing the results of Example V with those of Example VI, it can be deduced that while the results will be favorable when a passivating agent is injected into the catalyst regeneration cycle, different passivating agents may have different preferred points of injection.

It is evident from the foregoing that various modifications can be made to the embodiment of this invention without departing from the spirit and scope thereof which will be apparent to those skilled in the art. Having thus described the invention, it is claimed as follows.

That which is claimed is:

1. In a method of restoring the activity of a hydrocarbon cracking catalyst in which the cracking activity of said cracking catalyst is at least partially decreased by contaminating metals deposited thereon, the improvement comprising contacting said cracking catalyst with a metals passivating agent comprising:
   (a) water;
   (b) antimony; and
   (c) a vinyl copolymer, wherein said vinyl copolymer is the ammonium salt of hydrolyzed copolymers of methylvinyl ether and maleic anhydride.

2. A method recited in claim 1 wherein said antimony comprises an antimony oxide.

3. A method recited in claim 2 wherein said antimony oxide comprises antimony trioxide.

4. A method recited in claim 1 wherein said metals passivating agent further comprises ethylene glycol.

5. In a method of restoring the activity of a hydrocarbon cracking catalyst in which the cracking activity of said cracking catalyst is at least partially decreased by contaminating metals deposited thereon, the improvement comprising contacting said cracking catalyst with a metals passivating agent comprising:
   (a) water, wherein said water is in the range from about 10 to about 97 weight percent;

(b) antimony, wherein said antimony is in the range from about 1 to about 50 weight percent; and (c) a vinyl copolymer, wherein said vinyl copolymer is the ammonium salt of hydrolyzed copolymers of methylvinyl ether and maleic anhydride and is in the range from about 0.2 to about 3 weight percent, said weight percentages being based on the total weight of said metals passivating agent.

6. A method recited in claim 5 wherein said antimony comprises an antimony oxide.

7. A method recited in claim 5 wherein said antimony comprises antimony trioxide.

8. A method recited in claim 5 wherein said metals passivating agent further comprises ethylene glycol.

9. A process for restoring the activity of a hydrocarbon cracking catalyst in which the cracking activity of said cracking catalyst is at least partially decreased by contaminating metals deposited thereon comprising the step of injecting a metals passivating agent onto said cracking catalyst while said cracking catalyst is in the catalyst regeneration cycle, wherein said metals passivating agent comprises:

(a) water, wherein said water is in the range from about 10 to about 97 weight percent;

(b) antimony oxide, wherein said antimony is in the range from about 1 to about 50 weight percent; and () a vinyl copolymer, wherein said vinyl copolymer the ammonium salt of hydrolyzed copolymers of methylvinyl ether and maleic anhydride and is in the range from about 0.2 to about 3 weight percent, said weight percentages being based on the total weight of said metals passivating agent.

10. A process recited in claim 9 wherein said metals passivating agent further comprises ethylene glycol.

11. A process recited in claim 9 wherein said metals passivating agent is injected onto said cracking catalyst while said cracking catalyst is in the catalyst regenerator.

12. A process recited in claim 9 wherein said metals passivating agent is injected onto said cracking catalyst after said cracking catalyst exits the catalyst regenerator but before said cracking catalyst contacts the hydrocarbon feedstock.

13. A process recited in claim 9 wherein said metals passivating agent is injected into the cracking catalyst standpipe.

14. A process recited in claim 9 wherein said antimony oxide compound comprises antimony trioxide.

15. A process for restoring the activity of a hydrocarbon cracking catalyst in which the cracking activity of said cracking catalyst is at least partially decreased by contaminating metals deposited thereon comprising the step of injecting a metals passivating agent comprising antimony onto said cracking catalyst while said cracking catalyst is in the catalyst regeneration cycle, further characterized by the fact that said metals passivating agent comprises (a) water;

(b) antimony oxide; and (c) a vinyl copolymer, wherein said vinyl copolymer is the ammonium salt of hydrolyzed copolymers of methyl vinyl ether and maleic anhydride.

16. A process recited in claim 15 wherein said metals passivating agent further comprises ethylene glycol.

17. A process recited in claim 15 wherein said antimony oxide comprises antimony trioxide.

* * * * *

UNITED STATES PATENT AND TRADEMARK OFFICE
CERTIFICATE OF CORRECTION

PATENT NO. : 4,939,109

DATED : July 3, 1990

INVENTOR(S) : Marvin M. Johnson and Donald C. Tabler

It is certified that error appears in the above-identified patent and that said Letters Patent is hereby corrected as shown below:

Column 17, line 29, beginning of sentence, "0" should be deleted and insert therefor ---(c)---.

Signed and Sealed this

Twenty-fifth Day of June, 1991

Attest:

HARRY F. MANBECK, JR.

*Attesting Officer*   *Commissioner of Patents and Trademarks*